United States Patent [19]

Friedman

[11] 4,212,800

[45] Jul. 15, 1980

[54] INHIBITION OF LANTHIONINE FORMATION DURING ALKALINE TREATMENT OF KERATINOUS FIBERS

[75] Inventor: Mendel Friedman, Moraga, Calif.

[73] Assignee: The United States of America as represented by the Secretary of Agriculture, Washington, D.C.

[21] Appl. No.: 945,976

[22] Filed: Sep. 26, 1978

[51] Int. Cl.$^2$ ............................ A23J 1/10; C07G 7/00
[52] U.S. Cl. ................................ 260/123.7; 8/128 R; 260/112 R; 260/123.5; 426/656
[58] Field of Search ...................... 260/123.7; 8/128 R

[56] References Cited

U.S. PATENT DOCUMENTS

| | | | |
|---|---|---|---|
| 2,728,759 | 12/1955 | Keil | 260/123.7 |
| 2,729,628 | 1/1956 | Mann | 260/123.7 |
| 2,986,445 | 5/1961 | Koenig | 8/128 R |
| 3,079,215 | 2/1963 | Koenig | 8/128 R |
| 3,097,052 | 7/1963 | Koenig | 8/128 R |
| 4,035,349 | 7/1977 | Finley et al. | 260/123.5 |

OTHER PUBLICATIONS

Earland et al, Nature, vol. 191, Jul. 22, 1961, p. 384.
House, *Modern Synthetic Reactions*, W. A. Benjamin, Inc., N.Y. (1965) pp. 195–197.

*Primary Examiner*—Walter C. Danison
*Attorney, Agent, or Firm*—M. Howard Silverstein; David G. McConnell

[57] ABSTRACT

Lysinoalanine formation during alkaline treatment of edible proteinaceous material containing lysine is inhibited by acetylating the $\epsilon$-amino group of the lysine prior to treatment of the material with alkali. Both lysinoalanine and lanthionine formation are inhibited in the alkaline treatment of keratinous fibers containing lysine by acylating the $\epsilon$-amino group of lysine with an acyl moiety containing from one to eight carbon atoms.

5 Claims, No Drawings

INHIBITION OF LANTHIONINE FORMATION DURING ALKALINE TREATMENT OF KERATINOUS FIBERS

BACKGROUND OF THE INVENTION

1. Field of the Invention

The invention relates to and has among its objects the inhibition of lysinoalanine formation which occurs when treating proteinaceous materials with alkali. Further objects of the invention will be evident from the following description wherein parts and percentages are by weight unless otherwise specified.

2. Description of the Prior Art

Proteinaceous materials are commonly treated with alkali in the course of preparing protein concentrates or isolates for food or feed use. For example, in preparing soy protein concentrates a usual step is to extract soybeans with aqueous alkali and then precipitate the protein from the resulting solution. Similar alkali treatments are used in recovering proteins from such sources as cereal grains and milling by-products, and oilseeds such as peanuts, safflower seed, cottonseed, flaxseed, etc. Procedures are also known wherein proteins—such as soy protein—are modified by treatment with alkali to induce optimum adhesive properties for use in preparing textured foods.

Heretofore, it has been shown that when rats are fed a diet containing alkali-treated soy protein they suffer nephrotoxic effects. Woodward et al (*Journal of Nutrition*, Vol. 103, pages 569–574) investigated this problem and found that the nephrotoxic factor in the alkali-treated protein is heat stable and cannot be extracted with such solvents as water, methanol, chloroform, and hexane. Their studies demonstrated that the toxic factor is an unusual amino acid which is chemically bound to the protein chain, and that this amino acid is $N^{68}$-(DL-2-amino-2-carboxyethyl)-L-lysine. They assigned to it the abbreviated name "lysinoalanine," the latter being also used herein.

Lysinoalanine has the structure -

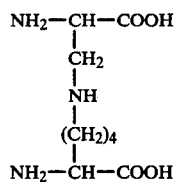

It is evident from the foregoing that the presence of lysinoalanine in products designed for use by humans or animals is undesirable.

Wool and other keratinous fibers are subjected to hot, alkaline conditions when treated with detergents, etc. Under such conditions lysinoalanine formation occurs resulting in a deterioration of many of the desired properties of the wool, e.g., hand, tensile strength, abrasion resistance, etc. Furthermore, lanthionine is also produced under alkaline conditions and this substance further contributes to the aforementioned deterioration in the desired properties of the wool.

In U.S. Pat. No. 4,035,349, there is described an improvement in the process of treating vegetable protein with alkali. In the patented method lysinoalanine formation is inhibited during alkaline treatment of protein by conducting the treatment in the presence of an added compound selected from the group consisting of sulfhydryl-containing amino acids, their esters, and amides in an amount sufficient to prevent lysinoalanine formation.

It is believed that when proteinaceous material is treated with alkali, lysinoalanine is produced in the following way: The alkali acts upon the cystine portion of the protein and degrades it to a dehydroalanine unit, which subsequently reacts with the $\epsilon$-amino group of a lysine unit to form a lysinoalanine unit in the protein molecule. These reactions may be represented schematically as follows:

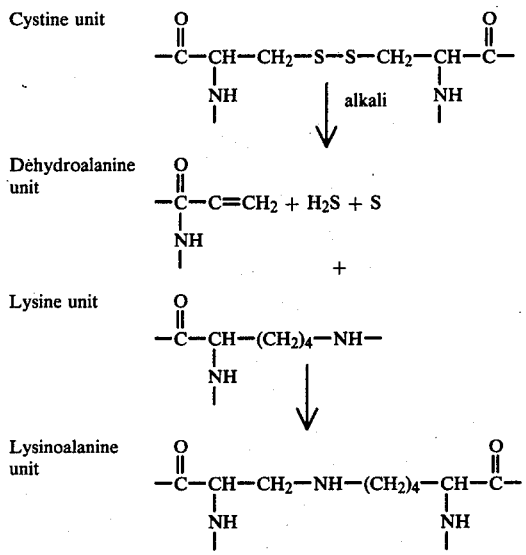

The sequence of reactions culminating in the formation of lanthionine may be illustrated as follows:

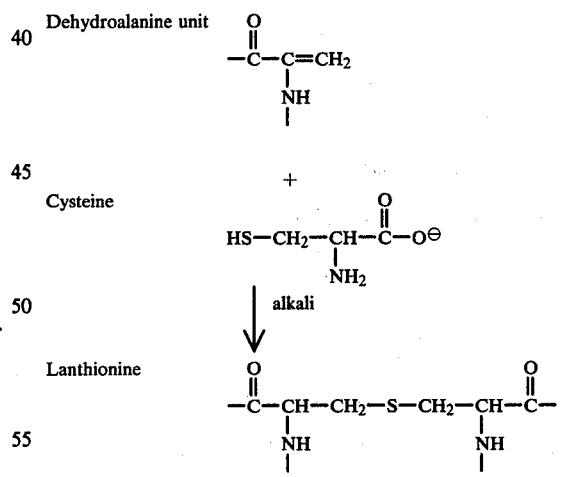

Cysteine in the presence of alkali combines with a dehydroalanine unit to give lanthionine.

One way to prevent lysinoalanine formation would be to block the $\epsilon$-amino group of lysine, such as by acylation, and thus render it incapable of reacting with dehydroalanine. This approach, however, would not be considered by the art skilled person for the following reasons. The resultant amide that formed would not be expected to be stable to the alkaline conditions employed in the treatment of the proteinaceous material. It would be anticipated that the amide would be hydrolyzed in the presence of alkali, thereby regenerating the ε-amino group of lysine, which would then react with dehydroalanine to produce lysinoalanine. Furthermore, even if it were assumed that the blocking group would be stable under alkaline conditions, one would expect the resultant protein product to be deficient in lysine, which would not be considered to be nutritionally available from its acylated (amide) derivative.

A final note is that blocking the ε-amino group of lysine would not be expected to have any effect whatsoever on the amount of lanthionine produced in the alkaline treatment of keratinous fibers. Lanthionine is formed by bonding between the vinyl group of the dehydroalanine unit and the sulfhydryl group of cysteine; acylation of the above-mentioned nature should not prevent such bonding.

SUMMARY OF THE INVENTION

We have found that the ε-amino group of lysine in edible proteinaceous matter can be protected by acylation. Lysinoalanine formation is inhibited in the alkaline treatment of proteinaceous material wherein the lysine is first protected in accordance with the instant invention. Furthermore, lysine is nutritionally available in the final product. The criteria for a proper acylating moiety are fulfilled by the acetyl group in that the acetylated material has the following characteristics: formable under conditions which avoid denaturation of the proteinaceous material, stable during alkaline treatment of the proteinaceous material, and capable of providing nutritionally available lysine free of detrimental residues for the consumer of the so-treated protein. The above criteria are not met by closely-related acyl groups such as propionyl, butanoyl, hexanoyl, heptanoyl, octanoyl, oxalyl, malonyl, succinyl, glutaryl, adipyl, pimelyl, and the like.

In another embodiment of the invention the ε-amino group of lysine in keratinous fibers can be protected with an acyl moiety containing one to eight carbon atoms. Examples of acyl groups which may be used in this particular embodiment of the invention, by way of illustration and not limitation, are formyl, acetyl, propionyl, butanoyl, pentanoyl, hexanoyl, heptanoyl, octanoyl, oxalyl, malonyl, succinyl, glutaryl, adipyl, pimelyl, oleyl, linoleyl, and so forth. When the so-modified keratinous fiber is exposed to alkaline conditions lysinoalanine and lanthionine formation are substantially reduced and often prevented.

One of the advantages of the invention is that the ε-amino group of lysine can be blocked under mild conditions, i.e., relatively neutral pH and low temperature. Thus, denaturation of the lysine unit which would decrease its nutritional contribution, is avoided. Furthermore, the vitality of other amino acids in the proteinaceous material is maintained. To achieve the advantages of the instant method, the proteinaceous matter is treated with an acetylating agent. The ε-amino groups of lysine react to form the corresponding amide; other amino acids in the proteinaceous matter remain intact.

Another advantage of the invention can be explained as follows. The protected lysine is consumed as part of the proteinaceous material and, as pointed out above, the lysine is nutritionally available. The acetyl group is removed in vivo. It is also important that the residues be inocuous, and this requirement is satisfied in the instant method. There may be instances in which nutritional availability of acetylated lysine would not be a critical factor. For example, certain preparations for use on hair, such as hair sprays, shampoos, etc., contain proteinaceous material including lysine. Lysinoalanine could be formed on the scalp by the action of soaps and the like or under the influence of heat from the sun. Acylation of the ε-amino group of lysine offers a means for avoiding such a result.

Another advantage of the invention with respect to keratinous fibers such as wool is that the desired properties of the wool are retained during and after exposure of the wool to alkali. The formation of compounds that cause deleterious effects in these properties are prevented. Thus, lysinoalanine and, surprisingly, lanthionine are not produced if wool is modified in accordance with my invention. A further advantage is that the acyl derivatives of wool exhibit no significant loss of mechanical properties, such as tensile strength, abrasion resistance, etc. In addition, the material retains its original hand.

DESCRIPTION OF THE PREFERRED EMBODIMENTS

As mentioned above the benefits of the invention with respect to edible protein material are obtained by forming the acetyl amide of the ε-amino group of lysine. To this end the proteinaceous material to be protected is treated with an agent which will produce the desired acetylation. Generally, about 1.5–2 parts of acetylating agent are used per part of proteinaceous material. However, the amount of agent used is dependent upon the lysine content of the proteinaceous material. A sufficient amount of acylating agent should be employed to effectively block all of the ε-amino groups of the lysine. The lysine content of the proteinaceous material can be determined according to known procedures.

The temperature of the reaction is usually about 0°–5° C. and the reaction is conducted for a period long enough to acetylate all of the ε-amino groups of lysine, i.e., for about 60–150 minutes. The pH of the reaction mixture is maintained at about 6.5–7.0 during this period; conventional buffering systems may be used to achieve this end.

In practice, the protein to be protected is dispersed by solution, suspension, or the like, in an aqueous medium. The pH and temperature of the medium are adjusted to the appropriate values. Next, the acylating agent is added to the mixture, which is agitated by such means as stirring, shaking, and so forth. Following the reaction the treated proteinaceous material is subjected to collection and purifying procedures such as dialysis (against distilled water, generally), filtration, decantation, drying, lyophilization, etc.

Keratinous fibers can be acylated in a similar fashion. However, acylation can be accomplished in anhydrous organic solvents such as dimethylformamide (U.S. Pat. No. 2,986,445, herein incorporated by reference) and the like. Usually, about 1.5 to 2.0 parts of acylating agents is employed per part of wool. A sufficient amount of agent should be employed to effectively block all of the ε-amino groups of lysine and inhibit both lysinoalanine and lanthionine formation. In general, the temperature of the reaction is about 35°–105° C. and the reaction is conducted for a period of about 8 to 12 hours to acylate the aforesaid ε-amino groups. The reaction is carried out as described above.

Agents employed to impart the proper acyl group to lysine are conventional in the art. For example, to achieve acetylation of the ε-amino group one may use acetic anhydride, acetyl halides, acetic acid, and so forth. Similarly, for protection of keratinous fibers amide linkages may be formed using agents for formylation, propionylation, butanoylation, pentanoylation, hexanoylation, heptanoylation, octanoylation, oxalylation, malonylation, succinylation, glutarylation, adipylation, pimelylation, and so forth.

Proteinaceous matter modified in accordance with the invention can be treated with alkali in a conventional manner. The acyl group remains intact during the alkaline treatment, and lysinoalanine and, in the case of keratinous fibers, lanthionine formation are inhibited. Treated edible protein, however, provides nutritionally available lysine when the product is consumed.

It should be noted that other acylating groups may satisfy the above-listed requirements for the inhibition of lysinoalanine formation during treatment of edible proteinaceous material with alkali. For example, acylating agents that would yield peptide-like material may be successful. Thus, one may block the ε-amino group of lysine in edible proteinaceous matter with such groups as glycyl, alanyl, valyl, isoleucyl, seryl, tyrosyl, histyl, leucyl, phenylalanyl, threonyl, arginyl, glutamyl, and the like. In addition, one may employ an acyl group which would remain intact during alkaline treatment but which subsequently could be removed thereby freeing the ε-amino group and regenerating lysine.

EXAMPLES

The invention is demonstrated further by the following illustrative examples.

EXAMPLE 1

A. Gluten (12 g) was suspended in 100 ml of saturated sodium acetate solution and 100 ml of water contained in a 200 ml beaker. The mixture was cooled to 0° C. in an ice bath and maintained at 0° C. throughout the reaction. Acetic anhydride (20 ml) was added to the stirring mixture dropwise over a 90 minute period (about 4 drops per minute). The suspension was stirred for an additional two hours, dialyzed against distilled water, and lyophilized.

B. Acetylated soy protein (Promine-D) was prepared in a similar manner.

C. Succinylated wheat gluten was prepared as follows. Gluten (10 g) was suspended in 300 ml of water at 0° C. The pH of the suspension was adjusted to and maintained at 7.0 by addition of 0.01 N sodium hydroxide. A 7-g portion of succinic anhydride was added to the stirring suspension over a period of 90 minutes and stirring was continued for an additional ninety minutes. The reaction mixture was dialyzed against 0.01 N acetic acid and lyophilized.

D. Succinylated Promine-D was prepared by a procedure similar to that in C with the exception that the total reaction time was two hours and the suspension was dialyzed against water.

Alkali Treatment: A 1% suspension of proteinaceous material in 1 N aqueous sodium hydroxide (50 ml) was placed in a glass-stoppered Erlenmeyer flask, which was warmed to 65° C. in a water bath for 3 hours. Afterwards, the suspension was dialyzed against 0.01 N acetic acid for about 2 days and the product was lyophilized.

The amount of lysinoalanine formed during the alkaline treatment was determined as follows. A weighed sample (5 mg) of proteinaceous matter was hydrolyzed in 15 ml of 6 N hydrochloric acid in a commercial hydrolysis tube. The tube was evacuated, placed in a dry ice-acetone bath, twice evacuated and filled with nitrogen, and then placed in an oven at 100° C. for 24 hours. The cooled hydrolysate was filtered through a sintered disc funnel and evaporated to dryness at 40° C. with the aid of an aspirator; the residue was twice suspended in water and then evaporated to dryness.

Controls with wheat gluten (E) and soy protein, Promine-D (F), were also run.

Amino acid analysis of an aliquot of the soluble hydrolysate was carried out on a Durrum Amino Acid Analyzer, Model D-500 under the following conditions: single columns Moore-Stein ion-exchange chromatography method; Resin, Durrum DC-4A; buffer pH, 3.25, 4.25, 7.90; photometer, 440 nm, 590 nm; column, 1.75 mm × 48 cm; analysis time, 105 minutes. Norleucine was used as an internal standard. In this system, lysinoalanine (LAL) is eluted just before histidine. The color constant of LAL was determined with an authentic sample purchased from Miles Laboratories, Elkhart, Indiana.

The results are tabularized below.

| Run | Proteinaceous material | Blocking group | LAL (%)[b] |
|-----|------------------------|----------------|-----------|
| A | Gluten | Acetyl | 0.00 |
| B | Promine-D | Acetyl | 0.412 |
| C[a] | Gluten | Succinyl | 0.00 |
| D[a] | Promine-D | Succinyl | 0.138 |
| E[a] | Gluten | — | 0.634[c] |
| F[a] | Promine-D | — | 1.46[c] |

[a]Not in accordance with the invention but provided for purposes of comparison.
[b]Mole percent of total amount of amino acids.
[c]0.00% LAL prior to alkaline treatment.

EXAMPLE 2

Protein efficiency ratio (PER) was determined according to standard procedures described in "Official Methods of Analysis," Association of Official Analytical Chemists (AOAC), Twelfth Edition, Washington, D.C., page 857 (1975). Accordingly, weanling rats were fed a diet, wherein the material from either Run B or Run F was included, having the same content of nitrogen (N), fat, ash, moisture, and crude fiber.

Casein (American Nutritional Research Council) was employed as the standard reference material. The PER of casein was adjusted to 2.50 and the PER of each sample was adjusted accordingly.

The results are summarized in the following table.

| Sample | PER |
|--------|-----|
| Run B (acetylated Promine-D) | 1.13 |
| Run F[a] (Promine-D) | 1.12 |
| Casein[a] | 2.50 |

[a]Not in accordance with the invention but provided for purposes of comparison.

Succinylated Promine-D does not provide nutritionally available lysine.

EXAMPLE 3

AMINO ACID ANALYSIS OF PROTECTED AND UNPROTECTED GLUTEN

The amino acid compositions of gluten and Promine-D, protected and unprotected, from Example 1 are outlined below. The following abbreviations are used.

| | |
|---|---|
| Asp - aspartic acid | Ileu - isoleucine |
| Thr - threonine | Leu - leucine |
| Ser - serine | Tyr - tyrosine |
| Glu - glutamic acid | Phe - phenylalanine |
| Pro - promine | LAL - lysinoalanine |
| Gly - glycine | His - histidine |
| Ala - alanine | Lys - lysine |
| Val - valine | Arg - arginine |
| Met - methionine | |

| Run | Proteinaceous material | Blocking group | LAL (%) | LAN[b](%) |
|---|---|---|---|---|
| G | Wool | Acetyl | 0.00 | 0.00 |
| H | Wool | Succinyl | 0.00 | 0.00 |
| I | Wool | Glutaryl | 0.00 | 0.00 |
| J[a] | Wool | — | 0.97 | 0.97 |
| K[a] | Wool | — | 3.50[c] | 3.50[d] |

[a] Not in accordance with the invention but provided for purposes of comparison.
[b] Lanthionine.
[c] 0.00% LAL prior to alkaline treatment.

| Material | Asp | Thr | Ser | Glu | Pro | Gly | Ala | Val | Met | Ileu | Leu | Tyr | Phe | LAL | His | Lys | Arg |
|---|---|---|---|---|---|---|---|---|---|---|---|---|---|---|---|---|---|
| Run A | 3.37 | 1.32 | 2.64 | 30.58 | 20.43 | 4.79 | 4.02 | 4.74 | 1.39 | 4.26 | 9.41 | 2.14 | 5.75 | 0.00 | 1.76 | 1.54 | 1.82 |
| Run B | 14.58 | 2.07 | 2.34 | 17.60 | 6.77 | 7.73 | 7.36 | 6.62 | 1.13 | 4.64 | 10.16 | 2.35 | 4.15 | 0.412 | 1.97 | 6.13 | 3.92 |
| Run E | 2.96 | 1.18 | 2.29 | 31.24 | 25.09 | 3.55 | 3.65 | 4.06 | 1.23 | 3.94 | 8.80 | 1.78 | 5.40 | 0.634 | 1.63 | 0.857 | 1.72 |
| Run F | 14.24 | 2.10 | 2.84 | 17.55 | 6.82 | 7.29 | 6.62 | 6.29 | 0.802 | 4.47 | 9.47 | 2.36 | 5.17 | 1.46 | 2.30 | 4.96 | 5.23 |
| Gluten[a] | 3.20 | 3.19 | 6.81 | 27.90 | 18.33 | 6.01 | 3.91 | 4.36 | 1.35 | 3.68 | 7.48 | 2.49 | 4.35 | 0.00 | 1.87 | 1.33 | 2.75 |
| Promine-D[a] | 11.62 | 4.49 | 6.89 | 16.74 | 6.37 | 7.42 | 6.56 | 5.39 | 1.07 | 4.57 | 8.53 | 2.91 | 4.46 | 0.00 | 2.07 | 5.32 | 5.59 |

[a] Prior to treatment with alkali.
[d] 0.00% LAN prior to alkaline treatment.

EXAMPLE 4

G. Wool acetylated at the ε-amino position of lysine was prepared by immersing 1.2 g of wool in 10 ml of dimethylformamide containing 2.0 g of acetic anhydride for 30 minutes at 105° C. The treated wool was extracted three times with hot chloroform. The extracted product was dried and weighed 1.32 g.

H. Succinylated wool was prepared by the procedure outlined in G using succinic anhydride in place of acetic anhydride.

I. Glutarylated wool was also prepared by the procedure in G substituting glutaric anhydride for acetic anhydride.

Alkaline treatment of the modified wool and amino acid analyses were carried out as in Example 1 except that the alkali treatment was conducted in a 4:1 0.01 N:n-propanol mixture for 4 hours.

Non-modified wool subjected to alkali as above (J) and nonmodified wool without such treatment (K) were run as controls.

The results are summarized in the table below.

EXAMPLE 5

The amino acid composition of protected and unprotected wool from Example 4 are outlined in the following table.

| Material | Asp | Thr | Ser | Glu | Pro | Gly | Ala | Cys[a] | Val | Met | Ileu | Leu | Tyr | Phe | LAL | LAN | His | Lys | Arg |
|---|---|---|---|---|---|---|---|---|---|---|---|---|---|---|---|---|---|---|---|
| Run G | 6.42 | 6.71 | 11.85 | 12.27 | 7.40 | 9.12 | 5.74 | 9.69 | 5.96 | 0.42 | 3.18 | 7.92 | 3.50 | 2.52 | 0.00 | 0.00 | 0.34 | 2.73 | 5.91 |
| Run H | 6.42 | 6.47 | 10.77 | 12.22 | 6.80 | 8.76 | 5.78 | 10.26 | 5.74 | 0.41 | 3.14 | 7.81 | 3.52 | 2.58 | 0.00 | 0.00 | 0.80 | 2.24 | 6.47 |
| Run I | 6.78 | 6.73 | 11.36 | 12.35 | 6.90q | 9.22 | 5.80 | 8.06 | 5.80 | 0.35 | 3.15 | 8.18 | 2.57 | 2.85 | 0.00 | 0.00 | 0.77 | 2.57 | 6.55 |
| Run J | 6.76 | 6.65 | 10.84 | 13.97 | 7.04 | 8.10 | 5.59 | 3.24 | 5.81 | 0.27 | 3.29 | 8.05 | 3.34 | 2.51 | 0.97 | 3.50 | 0.81 | 2.13 | 6.99 |
| Run K | 6.24 | 6.52 | 10.75 | 11.84 | 7.82 | 8.43 | 5.43 | 9.99 | 5.59 | 0.43 | 3.12 | 7.55 | 3.57 | 2.48 | 0.00 | 0.00 | 0.80 | 2.81 | 6.73 |

[a] Cysteine.

Having thus described my invention, I claim:

1. In the process of treating keratinous fibers containing lysine with alkali, the improvement which comprises reacting the fibers prior to alkaline treatment with an acylating moiety containing from one to eight carbon atoms to inhibit the formation of lanthionine during the alkaline treatment.

2. The process of claim 1 wherein the keratinous fiber is wool.

3. The process of claim 1 wherein the acylating moiety is acetyl.

4. The process of claim 1 wherein the acylating moiety is succinyl.

5. The process of claim 1 wherein the acylating moiety is glutaryl.

* * * * *